(12) United States Patent
Kido

(10) Patent No.: US 11,920,812 B2
(45) Date of Patent: Mar. 5, 2024

(54) AIR CONDITIONING SYSTEM

(71) Applicant: Mitsubishi Electric Corporation, Tokyo (JP)

(72) Inventor: Shohei Kido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 736 days.

(21) Appl. No.: 17/047,112

(22) PCT Filed: May 16, 2018

(86) PCT No.: PCT/JP2018/018930
§ 371 (c)(1),
(2) Date: Oct. 13, 2020

(87) PCT Pub. No.: WO2019/220567
PCT Pub. Date: Nov. 21, 2019

(65) Prior Publication Data
US 2021/0156585 A1 May 27, 2021

(51) Int. Cl.
*F24F 11/61* (2018.01)
*F24F 11/56* (2018.01)
*F24F 11/65* (2018.01)

(52) U.S. Cl.
CPC ............ *F24F 11/61* (2018.01); *F24F 11/56* (2018.01); *F24F 11/65* (2018.01)

(58) Field of Classification Search
CPC ............ F24F 11/61; F24F 11/65; F24F 11/56
See application file for complete search history.

(56) References Cited

U.S. PATENT DOCUMENTS

2009/0014545 A1   1/2009   Horiuchi

FOREIGN PATENT DOCUMENTS

| JP | H11-241849 A | 9/1999 |
|---|---|---|
| JP | 2000-074435 A | 3/2000 |

(Continued)

OTHER PUBLICATIONS

Fukushima, Ventilation and air-conditioning system, 2014, Full Document (Year: 2014).*

(Continued)

*Primary Examiner* — Nael N Babaa
(74) *Attorney, Agent, or Firm* — POSZ LAW GROUP, PLC

(57) ABSTRACT

An air conditioning system for controlling air conditioning in a room in accordance with an air conditioning operation instruction received from a user includes: a ventilation device ventilating the room; an air agitation device agitating air in the room; an air conditioner controlling the air conditioning of the room and operations of the ventilation device and the air agitation device; and a detection device detecting presence of the user in the room. The air conditioner controls the operations of the ventilation device and the air agitation device before the user enters the room based on an indoor temperature inside the room, an outdoor temperature outside the room, an operation mode of air conditioning control performed by the air conditioner included in the air conditioning operation instruction, an operating status of the ventilation device, and a detection result provided by the detection device.

24 Claims, 7 Drawing Sheets

(56) References Cited

FOREIGN PATENT DOCUMENTS

| | | |
|---|---|---|
| JP | 2015-187510 A | 10/2015 |
| JP | 2015187510 A * | 10/2015 |

OTHER PUBLICATIONS

International Search Report of the International Searching Authority dated Jun. 26, 2018 for the corresponding International application No. PCT/JP2018/018930 (and English translation).
Extended European Search Report dated Apr. 23, 2021, issued in corresponding European Patent Application No. 18918790.9.

* cited by examiner

AIR CONDITIONING SYSTEM

CROSS REFERENCE TO RELATED APPLICATION

This application is a U.S. national stage application of International Patent Application No. PCT/JP2018/018930 filed on May 16, 2018, the disclosure of which is incorporated herein by reference.

TECHNICAL FIELD

The present invention relates to an air conditioning system that controls air conditioning in a room.

BACKGROUND

Some conventional systems for controlling air conditioning in a room are configured to detect in advance that a user will come back home and enter the room that is a target for which air conditioning is controlled, and if it is so, the conventional systems operate a ventilation device in the room in accordance with conditions such as outdoor temperature, indoor temperature, target temperature, and the like to let outside air into the room, and thereafter operate the air conditioning device. For example, the ventilation air conditioning system described in Patent Literature 1 can activate the air conditioning device before the user enters the room thereby to make a room space more comfortable environment when the user enters the room than when the air conditioning device is operated after the user enters the room. The ventilation air conditioning system described in Patent Literature 1 can also reduce the load in operation of air conditioning by operating the air conditioning device after discharging indoor accumulated hot air out of the room by ventilation.

PATENT LITERATURE

Patent Literature 1: Japanese Patent Application Laid-open No. 2015-187510

However, even though the ventilation air conditioning system described in Patent Literature 1 discharges the hot air accumulated in the room before a cooling operation to outside of the room, there is still a possibility that the load in the operation of air conditioning cannot be sufficiently reduced when the temperature distribution in the room is not uniform, which has been problematic. In addition, the ventilation air conditioning system described in Patent Literature 1 does not perform ventilation before a heating operation, therefore leading to a problem that the load in the operation of air conditioning is significantly heavy when the temperature distribution in the room is uneven at the time of heating operation.

SUMMARY

The present invention has been made in view of the above circumstances, and an object thereof is to provide an air conditioning system adapted to a case where control of air conditioning is performed before the user enters the room, which can perform ventilation and agitation before operating an air conditioner in accordance with an operation mode of the air conditioner and a state in temperature in the room.

In order to solve the above-described problems and achieve the object, present invention provides an air conditioning system for controlling air conditioning in a room in accordance with an air conditioning operation instruction received from a user, the air conditioning system comprising: a ventilation device to ventilate the room; an air agitation device to agitate air in the room; an air conditioner to control the air conditioning of the room and control operations of the ventilation device and the air agitation device; and a detection device to detect presence of the user in the room, wherein the air conditioner controls operations of the ventilation device and the air agitation device before the user enters the room on the basis of an indoor temperature that is a temperature inside the room, an outdoor temperature that is a temperature outside the room, an operation mode of air conditioning control performed by the air conditioner included in the air conditioning operation instruction, an operating status of the ventilation device, and a detection result provided by the detection device.

The air conditioning system according to the present invention can adapt to a case of controlling air conditioning before the user enters the room, which achieve an advantageous effect of making it possible to perform ventilation and agitation before operating the air conditioner in accordance with the operation mode of the air conditioner and the state in temperature in the room.

DETAILED DESCRIPTION

Hereinafter, an air conditioning system according to an embodiment of the present invention will be described in detail based on the drawings. What is noted is that the present invention is not necessarily limited by the embodiment.

Embodiment

Figure 1:
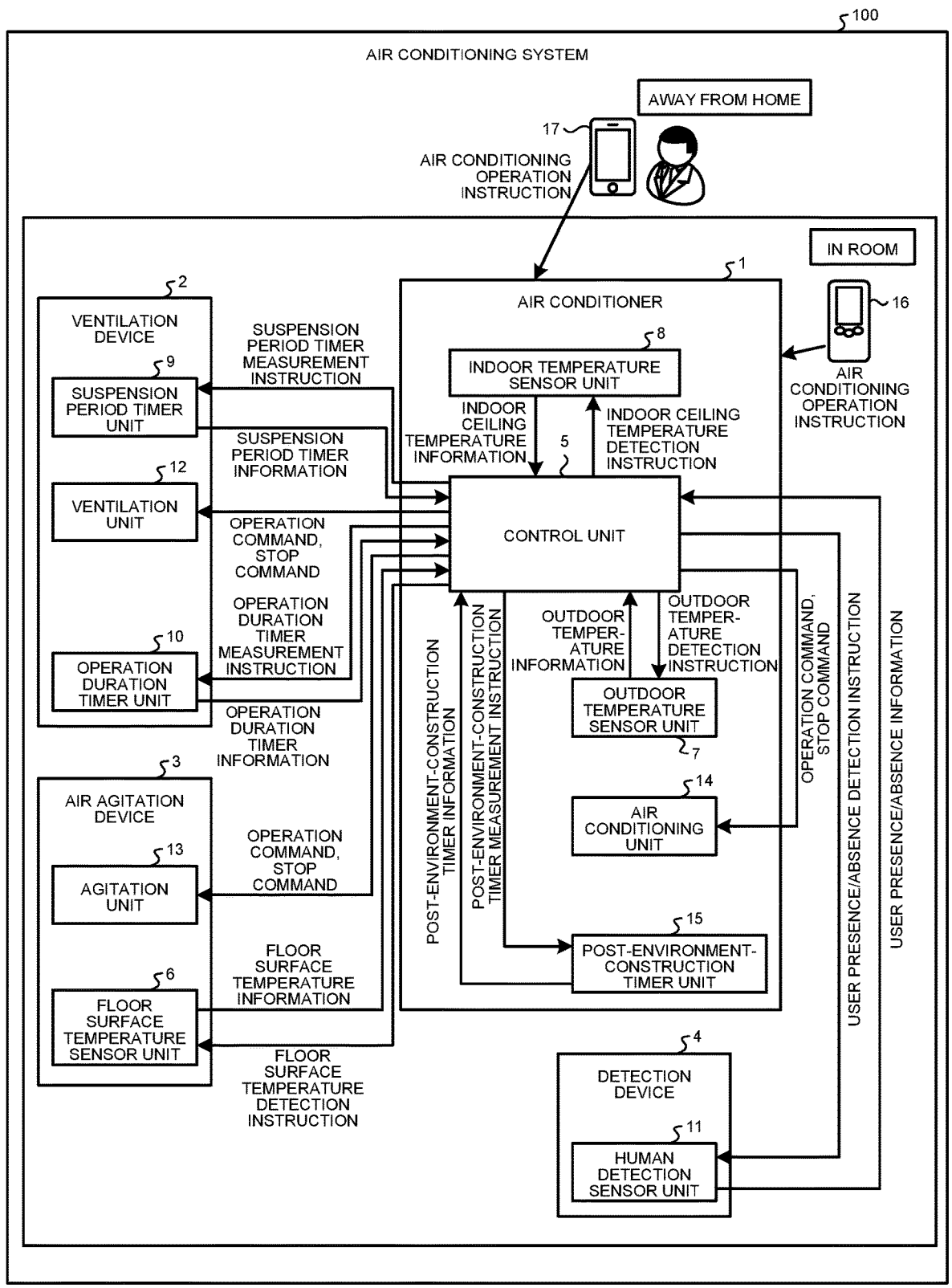
FIG. 1 is a diagram illustrating an exemplary configuration of an air conditioning system.

FIG. 1 is a diagram illustrating an exemplary configuration of an air conditioning system 100 according to an embodiment of the present invention. The air conditioning system 100 includes an air conditioner 1, a ventilation device 2, an air agitation device 3, a detection device 4, an air conditioner remote controller 16, and a terminal device 17. The air conditioner 1 transmits data to and receives data from the ventilation device 2, the air agitation device 3, and the detection device 4 using a communication line. The communication line may be a wired communication line or may be a wireless communication line. The air conditioner 1 receives an air conditioning operation instruction from the air conditioner remote controller 16 via a wired communication line or a wireless communication line. In order to wirelessly communicate with the air conditioner 1, the air conditioner remote controller 16 performs communication based on a communication scheme such as Bluetooth (registered trademark) or Wi-Fi (registered trademark) communication. The air conditioner remote controller 16 is supposed to be used by the user in the room. The air conditioner 1 receives an air conditioning operation instruction from the terminal device 17 via a wireless communication line. The terminal device 17 wirelessly communicates with the air conditioner 1 via, for example, the Internet line or a mobile phone line. The terminal device 17 is supposed to be used by the user outside the room, i.e. in a place away from home, and inside the room. The terminal device 17 is exemplified by, but not limited to, a portable type cloud terminal. In the air conditioner 1, a communication device (not illustrated) receives an air conditioning operation instruction from the air conditioner remote controller 16 and the terminal device 17, and outputs the air conditioning operation instruction to a control unit 5. In the air conditioning system 100, the air conditioner 1 controls air conditioning in the room in accordance with the air conditioning operation instruction received from the user via the air conditioner remote controller 16 or the terminal device 17.

The configuration of the air conditioner 1 will be described. The air conditioner 1 includes the control unit 5, an outdoor temperature sensor unit 7, an indoor temperature sensor unit 8, an air conditioning unit 14, and a post-environment-construction timer unit 15.

The air conditioning unit 14 includes an indoor unit and an outdoor unit, and controls air conditioning in a room in which the indoor unit is installed, as a controlled target. The air conditioning unit 14 exchanges heat between air sent from the indoor unit and outside air using the outdoor unit installed outside the building, for example. The air conditioning unit 14 performs an air conditioning operation in response to an operation command from the control unit 5 of the air conditioner 1, and stops the air conditioning operation in response to a stop command from the control unit 5 of the air conditioner 1.

The control unit 5 controls operations of the air conditioner 1, the ventilation device 2, and the air agitation device 3. The control unit 5 communicates with each component of the air conditioning system 100 according to the present embodiment, and controls the processing of the entire air conditioning system 100.

The outdoor temperature sensor unit 7 measures the outdoor temperature that is a temperature outside the building or outside the room. The outdoor temperature sensor unit 7 transmits the measured outdoor temperature as outdoor temperature information to the control unit 5 via a communication line. The outdoor temperature sensor unit 7 may measure the outdoor temperature on a regular basis, or may measure the outdoor temperature in response to receiving, from the control unit 5, an outdoor temperature detection instruction for instructing the outdoor temperature sensor unit 7 to transmit the outdoor temperature information. The outdoor temperature sensor unit 7 may be a dedicated temperature sensor or may be a temperature sensor for outdoor air temperature detection provided in the outdoor unit of the air conditioner 1. The air conditioner 1 may treat, as the outdoor temperature, an average value of outdoor temperatures measured by a plurality of outdoor temperature sensor units 7 disposed outside the room.

The indoor temperature sensor unit 8 measures the temperature inside the room. Specifically, the indoor temperature sensor unit 8 measures an indoor ceiling temperature that is an air temperature near a ceiling of the room. The indoor ceiling temperature is, for example, an air temperature within a range defined from the ceiling of the room that is a target for air conditioning control of the air conditioning system 100. The indoor temperature sensor unit 8 transmits the measured indoor ceiling temperature as indoor ceiling temperature information to the control unit 5 via a communication line. The indoor temperature sensor unit 8 may measure the indoor ceiling temperature on a regular basis, or may measure the indoor ceiling temperature in response to receiving, from the control unit 5, an indoor ceiling temperature detection instruction for instructing the indoor temperature sensor unit 8 to transmit the indoor ceiling temperature information. The indoor temperature sensor unit 8 may be a dedicated temperature sensor or may be a temperature sensor for indoor air temperature detection provided in the indoor unit of the air conditioner 1. The air conditioner 1 may treat, as the indoor ceiling temperature, an average value of indoor ceiling temperatures measured by a plurality of indoor temperature sensor units 8 disposed near the ceiling inside the room.

The post-environment-construction timer unit 15 measures the elapsed time from the time when the indoor ceiling temperature measured by the air conditioner 1 in operation, specifically, the indoor temperature sensor unit 8, becomes the same value as a target temperature included in the air conditioning operation instruction from the user, that is, from the time when a comfortable environment is constructed. The post-environment-construction timer unit 15 transmits the elapsed time from the time when a comfortable environment is constructed, as post-environment-construction timer information to the control unit 5 via a communication line.

The configuration of the ventilation device 2 will be described. The ventilation device 2 includes a suspension period timer unit 9, an operation duration timer unit 10, and a ventilation unit 12.

The ventilation unit 12 ventilates the room, that is, discharges indoor air out of the building and supplies outside air from outside of the building into the room. The ventilation unit 12 is, for example, a ventilation fan, which is configured to ventilate the entire room or the entire building. The ventilation unit 12 performs ventilation operation in response to an operation command from the control unit 5 of the air conditioner 1, and stops ventilation operation in response to a stop command from the control unit 5 of the air conditioner 1.

The suspension period timer unit 9 measures a suspension period from the time when the ventilation unit 12 stops ventilation operation. The suspension period timer unit 9 transmits the suspension period from the time when the ventilation unit 12 stops the ventilation operation, as suspension period timer information to the control unit 5 via a communication line.

The operation duration timer unit 10 measures a duration from the time when the ventilation unit 12 starts ventilation operation. The operation duration timer unit 10 transmits the duration from the time when the ventilation unit 12 starts the ventilation operation, as operation duration timer information to the control unit 5 via a communication line. Note that suspension period timer information and operation duration timer information, that is, the suspension period and duration in the ventilation device 2, may be collectively referred to as operating status of the ventilation device in some cases.

The configuration of the air agitation device 3 will be described. The air agitation device 3 includes an agitation unit 13 and a floor surface temperature sensor unit 6.

The agitation unit 13 agitates the air in the room and circulates the air in the room, thereby to correct uneven distribution of indoor air temperature to be uniform and maintain uniform temperature distribution. The agitation unit 13 is, for example, an indoor installation type circulator, which is installed on or near the floor surface. The agitation unit 13 performs an agitating operation in response to an operation command from the control unit 5 of the air conditioner 1, and stops the agitating operation in response to a stop command from the control unit 5 of the air conditioner 1.

The floor surface temperature sensor unit 6 measures the floor surface temperature in the room that is a target for air conditioning control of the air conditioning system 100. The floor surface temperature sensor unit 6 transmits the measured floor surface temperature as floor surface temperature information to the control unit 5 via a communication line. The floor surface temperature sensor unit 6 may measure the floor surface temperature on a regular basis, or may measure the floor surface temperature in response to receiving, from the control unit 5, a floor surface temperature detection instruction for instructing the floor surface temperature sensor unit 6 to transmit the floor surface temperature information. The air conditioner 1 may treat, as the floor surface temperature, an average value of floor surface temperatures measured by a plurality of floor surface temperature sensor units 6 disposed outside the air agitation device 3 inside the room.

The detection device 4 detects in advance that the user coming home from the outside will enter the room. The detection device 4 detects that the user will enter the room by receiving information obtained before the user enters the room. Examples of such information include: an air conditioning operation instruction to the air conditioner 1, which the terminal device 17 receives from the user in a place away from home and transmits to the air conditioner 1; position information provided by the car navigation system installed in the automobile driven by the user or provided by the global positioning system (GPS) function of the terminal device 17 carried by the user; destination information set in the car navigation system; and the like.

The detection device 4 includes a human detection sensor unit 11. The human detection sensor unit 11 detects the presence of a person in the room that is a target for air conditioning control of the air conditioning system 100. In this example, it is assumed that the person present in the room is the user. The human detection sensor unit 11 transmits the detection result, that is, information on whether or not the user is present in the room, as user presence/absence information to the control unit 5 via a communication line. Note that the user presence/absence information may be referred to as a detection result in some cases. The human detection sensor unit 11 may detect the presence of the user on a regular basis, or may detect the presence of the user in response to receiving, from the control unit 5, a user presence/absence detection instruction for instructing the human detection sensor unit 11 to transmit the user presence/absence information. In the example of FIG. 1, the presence of the user in the room is detected by the human detection sensor unit 11 owned by the detection device 4, but the present invention is not limited to this example. Instead of the human detection sensor unit 11 owned by the detection device 4, the air conditioning system 100 may use, for example, a human-presence sensor (not illustrated) provided in the air conditioner 1, a human-presence sensor set in indoor lighting equipment, or the like.

Figure 2:
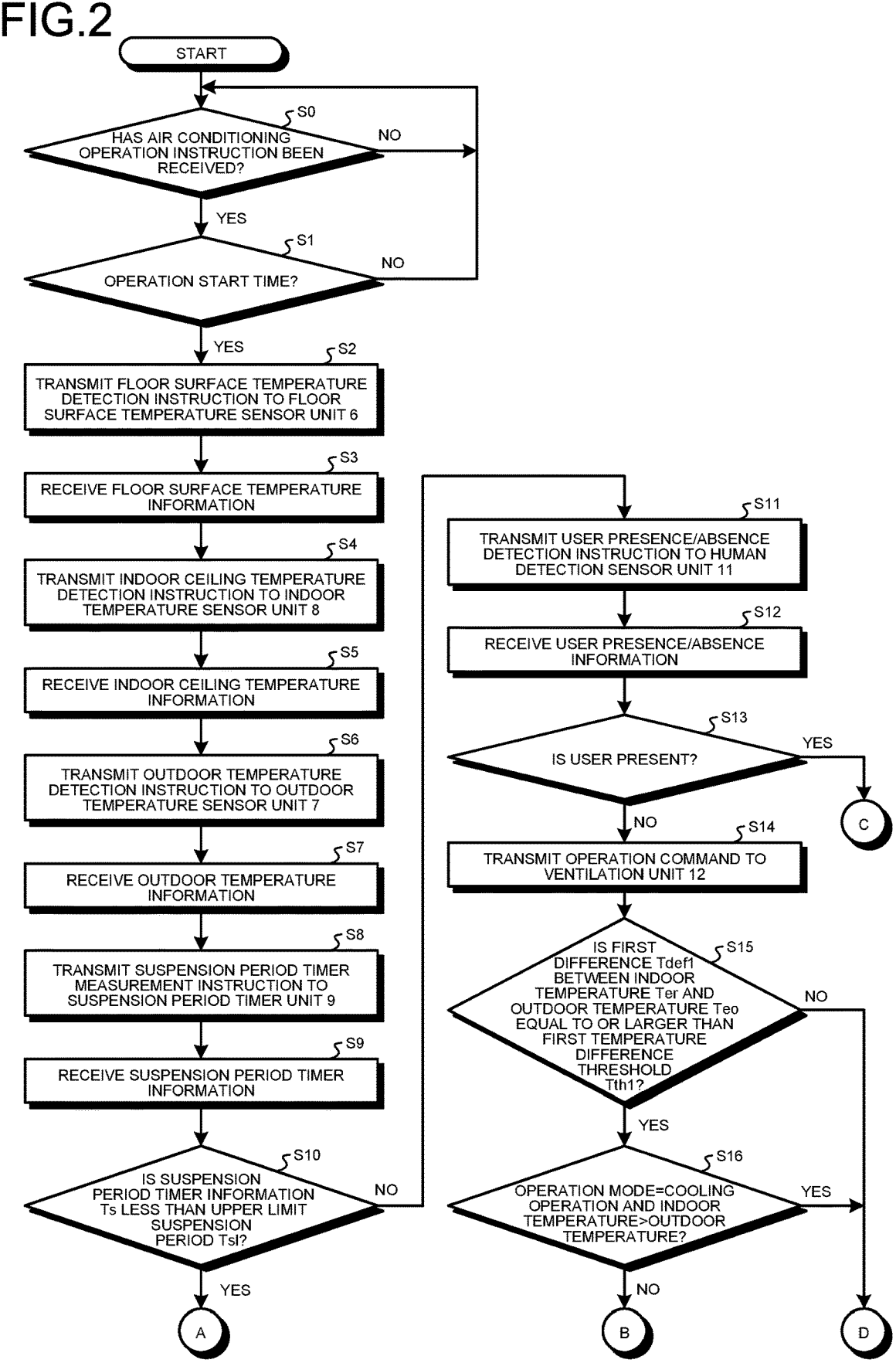
FIG. 2 is a first flowchart illustrating the operation of the air conditioning system.
Figure 3:
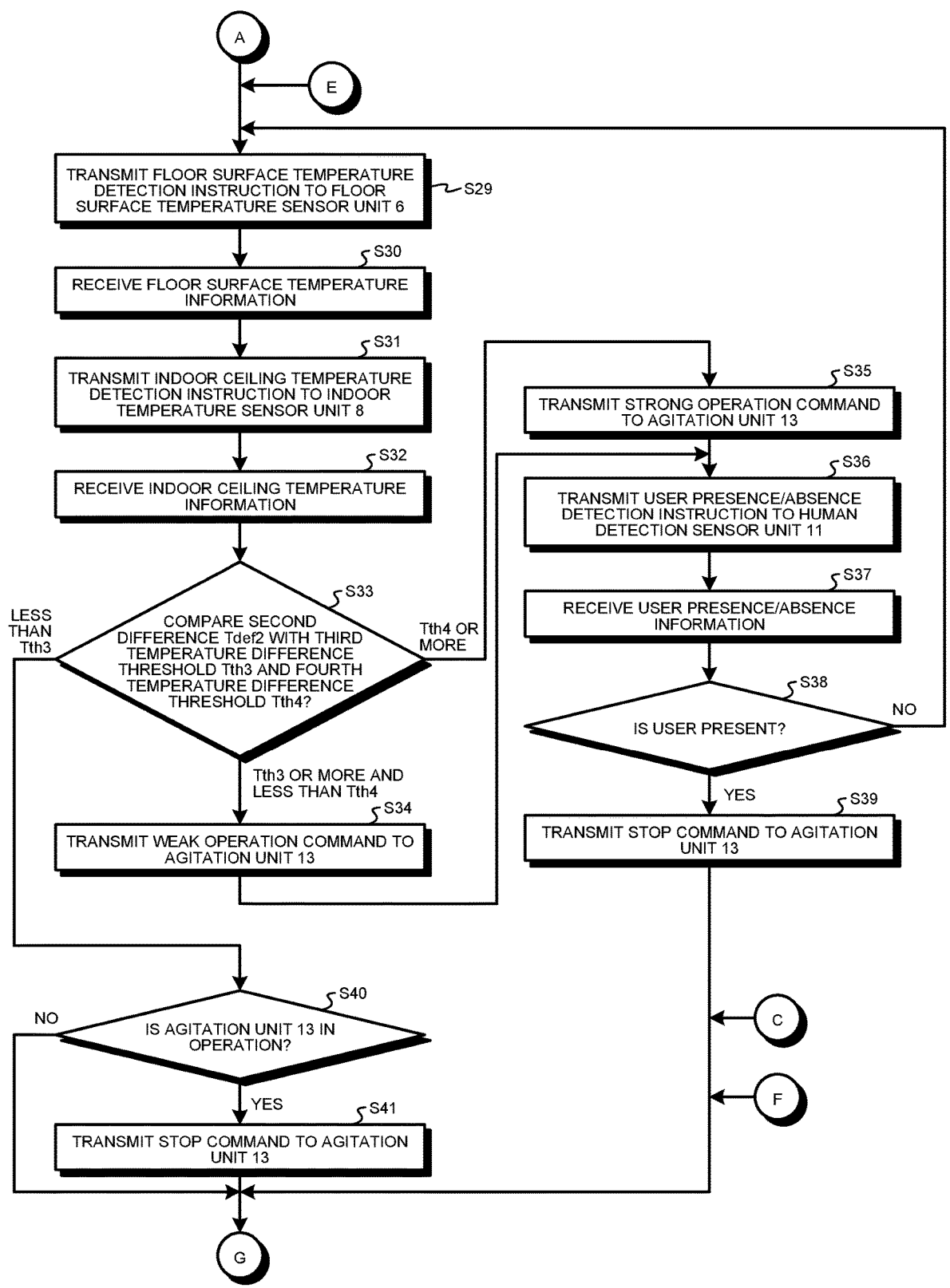
FIG. 3 is a second flowchart illustrating the operation of the air conditioning system.
Figure 4:
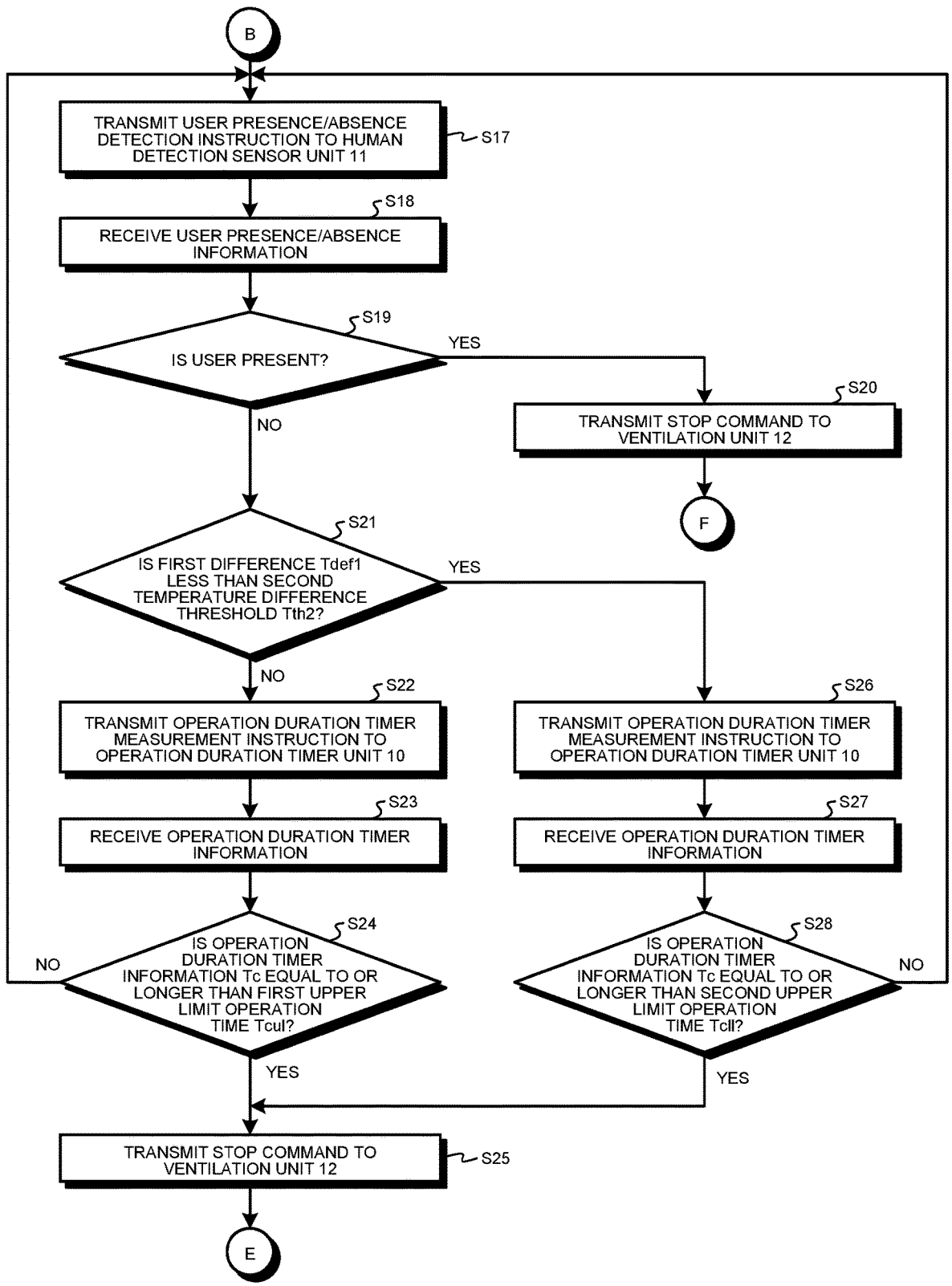
FIG. 4 is a third flowchart illustrating the operation of the air conditioning system.
Figure 5:
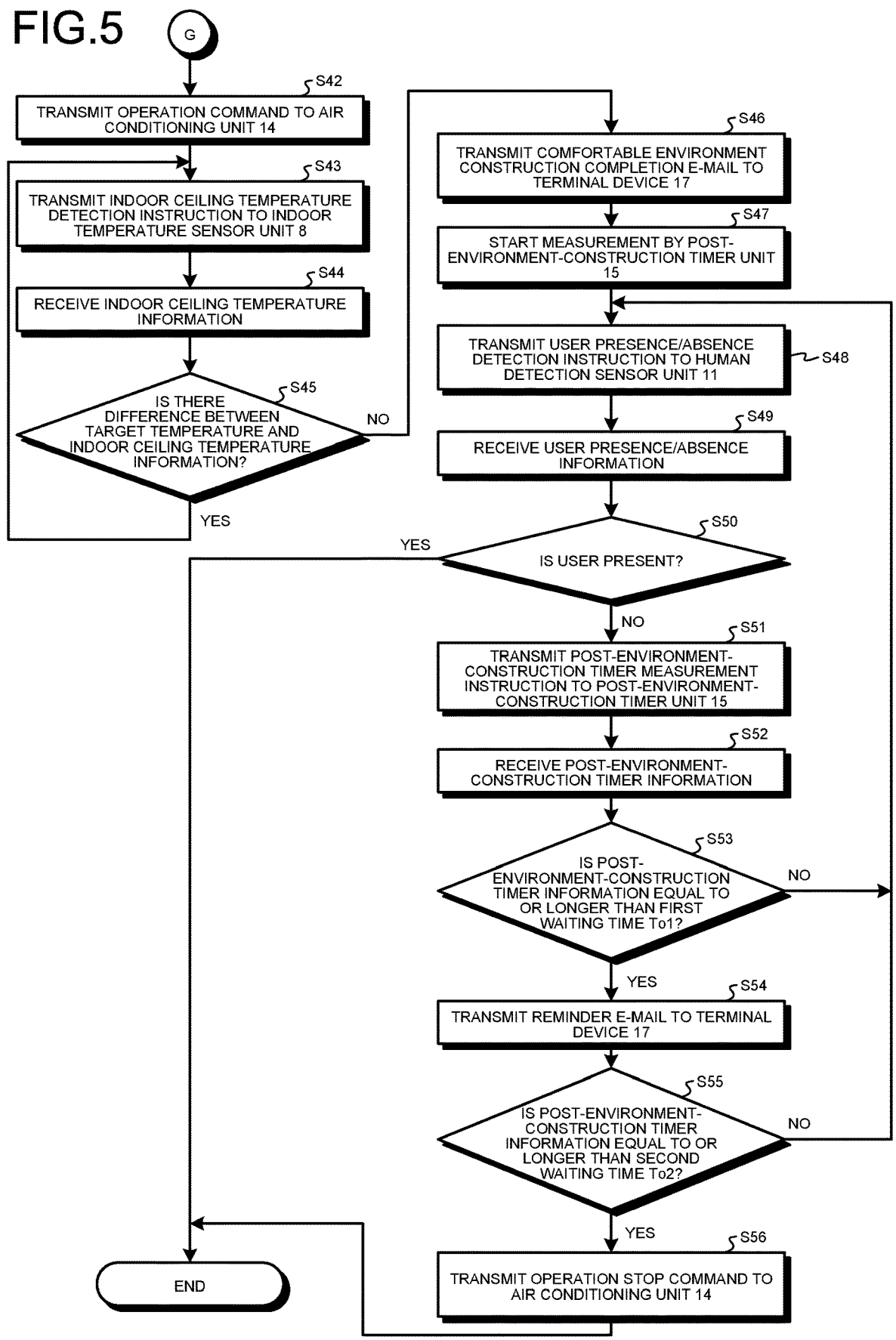
FIG. 5 is a fourth flowchart illustrating the operation of the air conditioning system.
Figure 6:
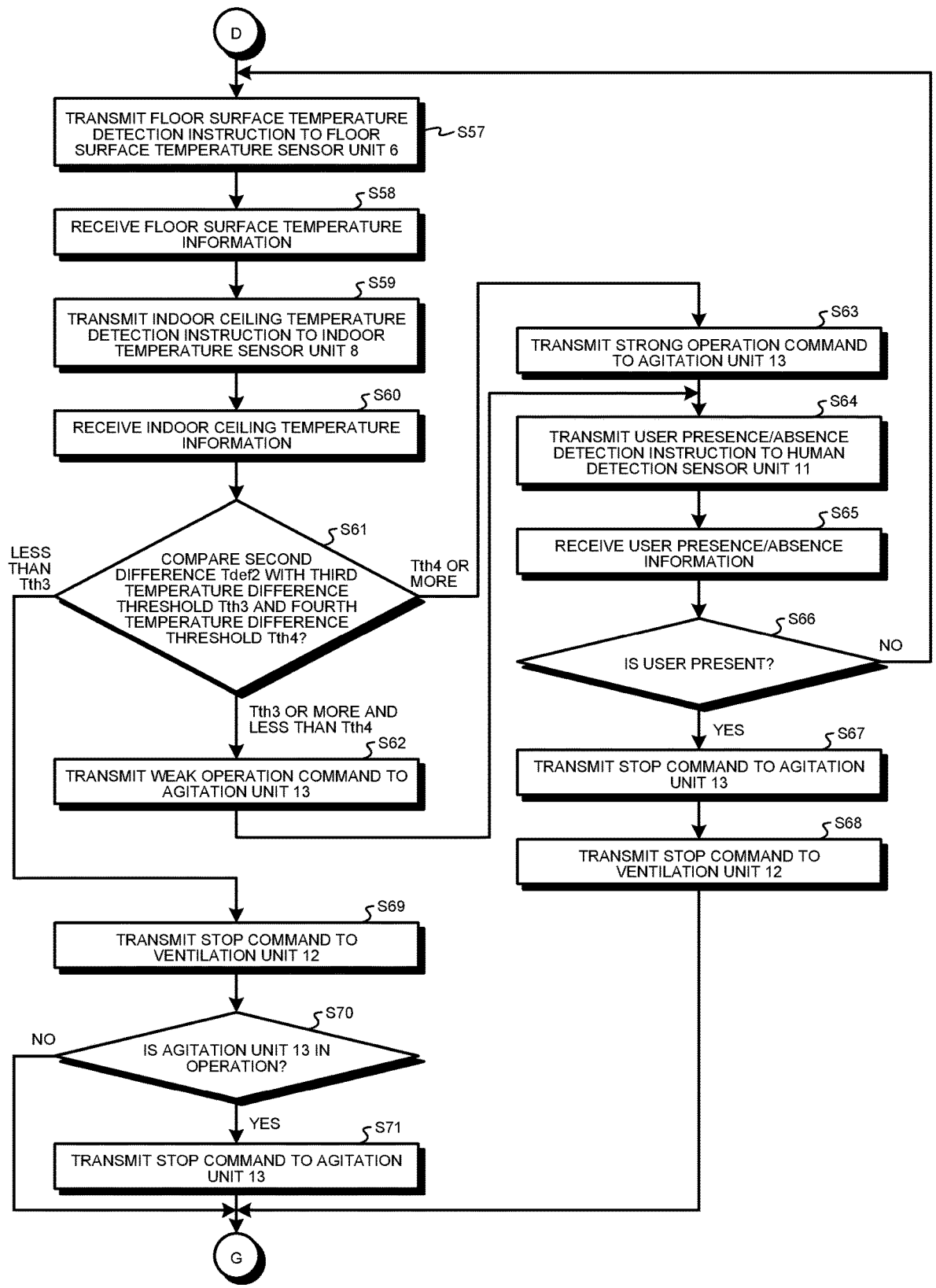
FIG. 6 is a fifth flowchart illustrating the operation of the air conditioning system.

Next, the operation of the air conditioning system 100 will be described. FIG. 2 is a first flowchart illustrating the operation of the air conditioning system 100 according to the present embodiment. FIG. 3 is a second flowchart illustrating the operation of the air conditioning system 100 according to the present embodiment. FIG. 4 is a third flowchart illustrating the operation of the air conditioning system 100 according to the present embodiment. FIG. 5 is a fourth flowchart illustrating the operation of the air conditioning system 100 according to the present embodiment. FIG. 6 is a fifth flowchart illustrating the operation of the air conditioning system 100 according to the present embodiment. The flowcharts illustrated in FIGS. 2 to 6 show a series of operations of the air conditioning system 100. Actually, the flowcharts illustrated in FIGS. 2 to 6 correspond to one showing how is control performed by the control unit 5 configured to control the operation of each device provided in the air conditioning system 100.

Here, as illustrated in the flowcharts of FIGS. 2 to 6, the operation of the air conditioning system 100 is roughly classified into four patterns A, B, C, and D, depending on the determination results in step S10, step S13, step S15, and step S16 described later. Pattern A corresponds to a flow for the case that the period from the time when the ventilation device 2 suspends the ventilation operation is short and ventilation of the room is not required. Pattern C corresponds to a flow for the case that the user is present in the room and therefore the air conditioning control by the air conditioner 1 is immediately performed without performing the ventilation operation of the ventilation device 2 and the agitating operation of the air agitation device 3. Each of patterns B and D corresponds to a flow for the case that the period from the time when the ventilation device 2 suspends the ventilation operation is long and the user is not present in the room.

Pattern B corresponds to a flow for a case that a first difference Tdef1 between the indoor temperature Ter that is an average value of the floor surface temperature information and the indoor ceiling temperature information, and the outdoor temperature Teo is larger than a first temperature difference threshold Tth1 preset by the user in advance and the operation mode of the air conditioner 1 is a heating operation mode, or another case that the first difference Tdef1 between the indoor temperature Ter and the outdoor temperature Teo is larger than the first temperature difference threshold Tth1, the operation mode of the air conditioner 1 is a cooling operation mode, and (indoor temperature Ter) (outdoor temperature Teo) is satisfied. In pattern B, the air conditioning system 100 performs control for keeping the first difference Tdef1 equal to or larger than the first temperature difference threshold Tth1 between the indoor temperature Ter and the outdoor temperature Teo to try to avoid increasing the operating load of the air conditioner 1. Specifically, the air conditioning system 100 performs control such that the air agitation device 3 performs an agitating operation after the ventilation operation of the ventilation device 2 is stopped. The air conditioning system 100 avoids the simultaneous operations of the ventilation device 2 and the air agitation device 3, so as to prevent high-capacity ventilation of the simultaneous operation of the ventilation device 2 and the air agitation device 3.

Pattern D corresponds to a flow for a case that the first difference Tdef1 between the indoor temperature Ter and the outdoor temperature Teo is equal to or less than the first temperature difference threshold Tth1, or another case that the first difference Tdef1 between the indoor temperature Ter and the outdoor temperature Teo is larger than the first temperature difference threshold Tth1, the operation mode of the air conditioner 1 is a cooling operation mode, and (indoor temperature Ter)>(outdoor temperature Teo) is satisfied. In pattern D, the air conditioning system 100 performs control for discharging indoor accumulated heat out of the room by ventilation, or control for preferentially ventilating the entire room because a possible loss of the first difference Tdef1 less than the first temperature difference threshold Tth1 between the indoor temperature Ter and the outdoor temperature Teo would amount to a small increase in the operating load of the air conditioner 1. In pattern D, the air conditioning system 100 allows a change in indoor temperature due to ventilation. Specifically, the air conditioning system 100 causes the air agitation device 3 to perform an agitating operation during the ventilation operation of the ventilation device 2, so as to perform high-capacity ventilation by the simultaneous operations of the ventilation device 2 and the air agitation device 3. Through the simultaneous operations of the ventilation device 2 and the air agitation device 3, the air conditioning system 100 can perform rapid ventilation and can also introduce fresh air into the entire room.

The operation of the air conditioning system 100 will be described using the flowcharts of FIGS. 2 to 6. In the air conditioner 1, the control unit 5 determines whether or not an air conditioning operation instruction has been received (step S0). For operating the air conditioner 1, the user uses the terminal device 17 in a place away from home or uses the air conditioner remote controller 16 in the room to transmit an air conditioning operation instruction including a target temperature, an operation mode, an operation start time, and the like to the air conditioner 1. If an air conditioning operation instruction has not been received (step S0: No), the control unit 5 waits to receive the air conditioning operation instruction.

In response to receiving an air conditioning operation instruction (step S0: Yes), the control unit 5 determines whether or not the current time has reached the operation start time included in the air conditioning operation instruction (step S1). If the current time has not reached the operation start time (step S1: No), the control unit 5 determines that the received air conditioning operation instruction is related to a reservation setting and returns to a process of step S0. The control unit 5 returns to a process of step S0 in the case of No in step S1, so that the control unit 5 can respond to an air conditioning operation instruction that may be newly transmitted by the user through the terminal device 17 or the air conditioner remote controller 16. After returning to a process of step S0, the control unit 5 may not newly receive an air conditioning operation instruction. In such a case, when now is the operation start time provided by the already received air conditioning operation instruction, the control unit 5 may determine that the current time has reached the operation start time. In a case where the air conditioning operation instruction does not include the operation start time, the control unit 5 may determine that the current time has reached the operation start time at the time of receiving the air conditioning operation instruction.

In response to the current time having reached the operation start time (step S1: Yes), the control unit 5 starts to control the air conditioning system 100, specifically, the air conditioning unit 14, the ventilation unit 12, and the agitation unit 13. First, the control unit 5 transmits, to the floor surface temperature sensor unit 6, a floor surface temperature detection instruction for instructing the floor surface temperature sensor unit 6 to transmit floor surface temperature information (step S2). Upon receiving the floor surface temperature detection instruction, the floor surface temperature sensor unit 6 measures the floor surface temperature and transmits the floor surface temperature information to the control unit 5. The control unit 5 receives the floor surface temperature information as a response to the floor surface temperature detection instruction (step S3). The control unit 5 transmits, to the indoor temperature sensor unit 8, an indoor ceiling temperature detection instruction for instructing the indoor temperature sensor unit 8 to transmit indoor ceiling temperature information (step S4). Upon receiving the indoor ceiling temperature detection instruction, the indoor temperature sensor unit 8 measures the indoor ceiling temperature and transmits the indoor ceiling temperature information to the control unit 5. The control unit 5 receives the indoor ceiling temperature information as a response to the indoor ceiling temperature detection instruction (step S5).

The control unit 5 transmits, to the outdoor temperature sensor unit 7, an outdoor temperature detection instruction for instructing the outdoor temperature sensor unit 7 to transmit outdoor temperature information (step S6). Upon receiving the outdoor temperature detection instruction, the outdoor temperature sensor unit 7 measures the outdoor temperature and transmits the outdoor temperature information to the control unit 5. The control unit 5 receives the outdoor temperature information as a response to the outdoor temperature detection instruction (step S7). The control unit 5 transmits, to the suspension period timer unit 9, a suspension period timer measurement instruction for instructing the suspension period timer unit 9 to transmit suspension period timer information (step S8). Upon receiving the suspension period timer measurement instruction, the suspension period timer unit 9 transmits, as suspension period timer information, to the control unit 5, the suspension period during which the ventilation unit 12 has suspended its ventilation operation at the time of the reception. The control unit 5 receives the suspension period timer information as a response to the suspension period timer measurement instruction (step S9).

The control unit 5 compares the suspension period timer information Ts with the upper limit suspension period Ts1 indicating the maximum suspension time for the ventilation unit 12 of the ventilation device 2 preset by the user (step S10). The upper limit suspension period Ts1 is an upper limit time for which a non-ventilation state that is allowed in the room. In a case where the suspension period timer information Ts is less than the upper limit suspension period Ts1 (step S10: Yes), the control unit 5 determines that a sufficient length in period has not passed since the ventilation unit 12 has performed the last ventilation operation, that is, the room does not require any ventilation. So, the control unit 5 proceeds to an operation for step S29 without transmitting an operation command to the ventilation unit 12. Yes in step S10 leads to pattern A described above. The operation on or after step S29 will be described later.

In a case where the suspension period timer information Ts is equal to or longer than the upper limit suspension period Ts1 (step S10: No), the control unit 5 determines that a sufficient length in period has passed since the ventilation unit 12 has performed the last ventilation operation, that is, the room requires some ventilation. The control unit 5 transmits, to the human detection sensor unit 11, a user presence/absence detection instruction for instructing the human detection sensor unit 11 to transmit user presence/absence information (step S1) Upon receiving the user presence/absence detection instruction, the human detection sensor unit 11 detects the presence of a person, namely the user, in the room at the time of the reception, and transmits the user presence/absence information to the control unit 5. The control unit 5 receives the user presence/absence information as a response to the user presence/absence detection instruction (step S12). The control unit 5 determines whether or not the user is present in the room (step S13). In the case of presence of the user in the room (step S13: Yes), the control unit 5 proceeds to an operation for step S42 without transmitting an operation command to the ventilation unit 12 and the agitation unit 13. Yes in step S13 leads to pattern C described above. The operation on or after step S42 will be described later.

In the case of absence of the user in the room (step S13: No), the control unit 5 transmits, to the ventilation unit 12, an operation command for instructing the ventilation unit 12 to start a ventilation operation (step S14). The control unit 5 calculates the average value of the received floor surface temperature information and indoor ceiling temperature information, and sets the calculated average value as the indoor temperature Ter indicating a temperature inside the room. The control unit 5 also calculates the first difference Tdef1 between the indoor temperature Ter and the outdoor temperature Teo indicated by the outdoor temperature information. The control unit 5 compares the calculated first difference Tdef1 with the first temperature difference threshold Tth1 preset by the user (step S15).

In the case of (first difference Tdef1)≥(first temperature difference threshold Tth1) (step S15: Yes), the control unit 5 determines the operation mode of the air conditioner 1 included in the air conditioning operation instruction received in step S0, and further compares the indoor temperature Ter with the outdoor temperature Teo (step S16). When the operation mode of the air conditioner 1 is a heating operation mode, or when the operation mode of the air conditioner 1 is a cooling operation mode and (indoor temperature Ter) (outdoor temperature Teo) is satisfied (step S16: No), the control unit 5 proceeds to an operation for step S17. No in step S16 leads to pattern B described above. The operation on or after step S17 will be described later.

In the case of (first difference Tdef1)<(first temperature difference threshold Tth1) (step S15: No), the control unit 5 proceeds to an operation for step S57. When the operation mode of the air conditioner 1 is a cooling operation mode and (indoor temperature Ter)>(outdoor temperature Teo) is satisfied (step S16: Yes), the control unit 5 proceeds to an operation for step S57. No in step S15 and Yes in step S16 lead to pattern D described above. The operation on or after step S57 will be described later.

Below is a description of the operation of pattern B. In the case of No in step S16, the control unit 5 transmits a user presence/absence detection instruction to the human detection sensor unit 11 (step S17). Upon receiving the user presence/absence detection instruction, the human detection sensor unit 11 detects the presence of the user in the room at the time of the reception, and transmits the user presence/absence information to the control unit 5. The control unit 5 receives the user presence/absence information as a response to the user presence/absence detection instruction (step S18). The control unit 5 determines whether or not the user is present in the room (step S19). In the case of presence of the user in the room (step S19: Yes), the control unit 5 needs to start the air conditioning operation of the air conditioner 1, and therefore transmits a stop command for instructing the ventilation unit 12 to stop ventilation operation to the ventilation unit 12 (step S20). Then, the control unit 5 proceeds to an operation for step S42. The ventilation unit 12 stops the ventilation operation. The operation on or after step S42 will be described later.

In the case of absence of the user in the room (step S19: No), the control unit 5 compares the first difference Tdef1 with the second temperature difference threshold Tth2 preset by the user (step S21). Here, (first temperature difference threshold Tth1)<(second temperature difference threshold Tth2) is set.

In the case of (first difference Tdef1)≥(second temperature difference threshold Tth2) (step S21: No), the control unit 5 transmits, to the operation duration timer unit 10, an operation duration timer measurement instruction for instructing the operation duration timer unit 10 to transmit the operation duration timer information obtained by measurement of a duration time from the start of the ventilation operation (step S22). Upon receiving the operation duration timer measurement instruction, the operation duration timer unit 10 transmits the operation duration timer information to the control unit 5. The control unit 5 receives the operation duration timer information as a response to the operation duration timer measurement instruction (step S23). The control unit 5 compares the operation duration timer information Tc with the first upper limit operation time Tcul preset by the user as an upper limit time on a ventilation operation in the ventilation unit 12 for the case of (first difference Tdef1)≥(second temperature difference threshold Tth2) (step S24). In the case of (operation duration timer information Tc) (first upper limit operation time Tcul) (step S24: Yes), the control unit 5 transmits a stop command for instructing the ventilation unit 12 to stop the ventilation operation, to the unit 12 (step S25), and proceeds to an operation for step S29. The ventilation unit 12 stops the ventilation operation. In the case of (operation duration timer information Tc)<(first upper limit operation time Tcul) (step S24: No), the control unit 5 returns to an operation for step S17.

In the case of (first difference Tdef1)<(second temperature difference threshold Tth2) (step S21: Yes), the control unit 5 transmits an operation duration timer measurement instruction to the operation duration timer unit 10 (step S26). Upon receiving the operation duration timer measurement instruction, the operation duration timer unit 10 transmits the operation duration timer information to the control unit 5. The control unit 5 receives the operation duration timer information as a response to the operation duration timer measurement instruction (step S27) The control unit 5 compares the operation duration timer information Tc with the second upper limit operation time Tcll preset by the user as an upper limit time on ventilation operation in the ventilation unit 12 for the case of (first difference Tdef1)< (second temperature difference threshold Tth2) (step S28). Here, (first upper limit operation time Tcul)>(second upper limit operation time Tcll) is set. In the case of (operation duration timer information Tc)≥(second upper limit operation time Tcll) (step S28: Yes), the control unit 5 transmits a stop command for instructing the ventilation unit 12 to stop its ventilation operation, to the ventilation unit 12 (step S25), and proceeds to an operation for step S29. The ventilation unit 12 stops ventilation operation. In the case of (operation duration timer information Tc)<(second upper limit operation time Tcll) (step S28: No), the control unit 5 returns to an operation for step S17. In this manner, the control unit 5 causes the ventilation unit 12 to perform a ventilation operation based on the comparison result between the first difference Tdef1 and the second temperature difference threshold Tth2, and thereafter stops the ventilation operation of the ventilation unit 12.

In the case of Yes in step S10, or after the operation for step S25, the control unit 5 transmits a floor surface temperature detection instruction to the floor surface temperature sensor unit 6 (step S29). Upon receiving the floor surface temperature detection instruction, the floor surface temperature sensor unit 6 measures the floor surface temperature and transmits the floor surface temperature information to the control unit 5. The control unit 5 receives the floor surface temperature information as a response to the floor surface temperature detection instruction (step S30). The control unit 5 transmits an indoor ceiling temperature detection instruction to the indoor temperature sensor unit 8 (step S31). Upon receiving the indoor ceiling temperature detection instruction, the indoor temperature sensor unit 8 measures the indoor ceiling temperature and transmits the indoor ceiling temperature information to the control unit 5. The control unit 5 receives the indoor ceiling temperature information as a response to the indoor ceiling temperature detection instruction (step S32).

The control unit 5 calculates the second difference Tdef2 between the floor surface temperature Tfr and the indoor ceiling temperature Tcel. The control unit 5 compares the calculated second difference Tdef2 with the third temperature difference threshold Tth3 and the fourth temperature difference threshold Tth4 each preset by the user (step S33). Here, (second temperature difference threshold Tth2)<(third temperature difference threshold Tth3)<(fourth temperature difference threshold Tth4) is set. In the case of (third temperature difference threshold Tth3)<(second difference Tdef2)<(fourth temperature difference threshold Tth4) (step S33: Tth3 or more and less than Tth4), the control unit 5 transmits an operation command for instructing the agitation unit 13 to start a "weak"-setting mode agitating operation, to the agitation unit 13 (step S34). In the case of (second difference Tdef2)≥(fourth temperature difference threshold Tth4) (step S33: Tth4 or more), the control unit 5 transmits an operation command for instructing the agitation unit 13 to start a "strong"-setting mode agitating operation, to the agitation unit 13 (step S35). In this way, in a case where the second difference Tdef2 between the floor surface temperature Tfr and the indoor ceiling temperature Tcel is equal to or larger than the third temperature difference threshold Tth3, the control unit 5 causes the agitation unit 13 to perform an agitating operation.

The control unit 5 transmits a user presence/absence detection instruction to the human detection sensor unit 11 (step S36). Upon receiving the user presence/absence detection instruction, the human detection sensor unit 11 detects the presence of the user in the room at the time of the reception, and transmits the user presence/absence information to the control unit 5. The control unit 5 receives the user presence/absence information as a response to the user presence/absence detection instruction (step S37). The control unit 5 determines whether or not the user is present in the room (step S38). In the case of presence of the user in the room (step S38: Yes), the control unit 5 needs to start the air conditioning operation of the air conditioner 1, and therefore transmits a stop command for instructing the agitation unit 13 to stop its agitating operation, to the agitation unit 13 (step S39). Then, the control unit 5 proceeds to an operation for step S42. The agitation unit 13 stops its agitating operation. The operation on or after step S42 will be described later. In the case of absence of the user in the room (step S38: No), the control unit 5 returns to an operation for step S29.

In the case of (second difference Tdef2)<(third temperature difference threshold Tth3) (step S33: less than Tth3), the control unit 5 determines whether or not the agitation unit 13 is in operation (step S40). When the agitation unit 13 is in operation (step S40: Yes), the control unit 5 transmits a stop command for instructing the agitation unit 13 to stop its agitating operation, to the agitation unit 13 (step S41). The agitation unit 13 stops the agitating operation. When the agitation unit 13 is in stopped state (step S40: No), the control unit 5 skips an operation for step S41 and proceeds to an operation for step S42.

The control unit 5 controls the air conditioning operation of the air conditioning unit 14 in a state in which the ventilation unit 12 is not performing a ventilation operation and in a state in which the agitation unit 13 is not performing an agitating operation. The control unit 5 transmits an operation command to the air conditioning unit 14 based on the air conditioning operation instruction received in step S0 (step S42). The air conditioning unit 14 performs an air conditioning operation in accordance with the received operation command. The control unit 5 transmits an indoor ceiling temperature detection instruction to the indoor temperature sensor unit 8 (step S43). Upon receiving the indoor ceiling temperature detection instruction, the indoor temperature sensor unit 8 measures the indoor ceiling temperature and transmits the indoor ceiling temperature information to the control unit 5. The control unit 5 receives the indoor ceiling temperature information as a response to the indoor ceiling temperature detection instruction (step S44). The control unit 5 compares a target temperature included in the air conditioning operation instruction with the indoor ceiling temperature information, and determines whether or not there is a significant difference between the target temperature and the indoor ceiling temperature information (step S45). A case of no such a difference means that the indoor ceiling temperature has reached the target temperature. When there is the difference (step S45: Yes), the control unit 5 returns to an operation for step S43.

When there is no such a difference (step S45: No), the control unit 5 transmits, to the terminal device 17 if the transmission source of the air conditioning operation instruction is the terminal device 17, a comfortable environment construction completion e-mail indicating that the indoor ceiling temperature has reached the target temperature included in the air conditioning operation instruction, that is, the construction of a comfortable air environment has been completed (step S46). The comfortable environment construction completion e-mail may be referred to as a first notification. After transmitting the e-mail, the control unit 5 instructs the post-environment-construction timer unit 15 to measure a post-environment-construction timer time indicating the elapsed time from the completion of the construction of a comfortable air environment. The post-environment-construction timer unit 15 starts to measure the post-environment-construction timer time (step S47).

The control unit 5 transmits a user presence/absence detection instruction to the human detection sensor unit 11 (step S48). Upon receiving the user presence/absence detection instruction, the human detection sensor unit 11 detects the presence of the user in the room at the time of the reception, and transmits the user presence/absence information to the control unit 5. The control unit 5 receives the user presence/absence information as a response to the user presence/absence detection instruction (step S49). The control unit 5 determines whether or not the user is present in the room (step S50). In the case of presence of the user in the room (step S50: Yes), the control unit 5 ends the operation. In the case of absence of the user in the room (step S50: No), the control unit 5 transmits a post-environment-construction timer measurement instruction for instructing the post-environment-construction timer unit 15 to transmit post-environment-construction timer information, to the post-environment-construction timer unit 15 (step S51).

Upon receiving the post-environment-construction timer measurement instruction, the post-environment-construction timer unit 15 transmits the post-environment-construction timer information to the control unit 5. The control unit 5 receives the post-environment-construction timer information as a response to the post-environment-construction timer measurement instruction (step S52).

The control unit 5 compares the post-environment-construction timer information with the first waiting time To1 that is a waiting time preset by the user (step S53). In a case where the post-environment-construction timer information is less than the first waiting time To1 (step S53: No), the control unit 5 returns to an operation for step S48. In a case where the post-environment-construction timer information is equal to or longer than the first waiting time To1 (step S53: Yes), the control unit 5 transmits a reminder e-mail to the terminal device 17 of the user (step S54). The reminder e-mail may be referred to as a second notification. In adapting to assumption that the user is not aware of the e-mail transmitted in step S46, which has a message that the construction of a comfortable air environment has been completed, the control unit 5 transmits another e-mail that reminds the user to return home to the terminal device 17 of the user. The control unit 5 compares the post-environment-construction timer information with the second waiting time To2 that is a waiting time preset by the user (step S55). Here, (first waiting time To1)<(second waiting time To2) is set. In a case where the post-environment-construction timer information is less than the second waiting time To2 (step S55: No), the control unit 5 returns to an operation for step S48. In a case where the post-environment-construction timer information is equal to or longer than the second waiting time To2 (step S55: Yes), the control unit 5 transmits, to the air conditioning unit 14, an operation stop command for instructing the air conditioning unit 14 to stop its air conditioning operation (step S56), and ends the operation. The air conditioning unit 14 stops its air conditioning operation. The first waiting time To1 and the second waiting time To2 may be collectively referred to as a waiting time in some cases. In a case where the post-environment-construction timer information is equal to or longer than the first waiting time To1 (step S53: Yes), the control unit 5 may transmit an operation stop command for instructing the air conditioning unit 14 to stop an air conditioning operation, to the unit 14, without transmitting a reminder e-mail.

Below is a description of the operation of pattern D. In the case of No in step S15 or Yes in step S16, the control unit 5 transmits a floor surface temperature detection instruction to the floor surface temperature sensor unit 6 (step S57). Upon receiving the floor surface temperature detection instruction, the floor surface temperature sensor unit 6 measures the floor surface temperature and transmits the floor surface temperature information to the control unit 5. The control unit 5 receives the floor surface temperature information as a response to the floor surface temperature detection instruction (step S58). The control unit 5 transmits an indoor ceiling temperature detection instruction to the indoor temperature sensor unit 8 (step S59). Upon receiving the indoor ceiling temperature detection instruction, the indoor temperature sensor unit 8 measures the indoor ceiling temperature and transmits the indoor ceiling temperature information to the control unit 5. The control unit 5 receives the indoor ceiling temperature information as a response to the indoor ceiling temperature detection instruction (step S60).

The control unit 5 calculates the second difference Tdef2 between the floor surface temperature Tfr and the indoor ceiling temperature Tcel. The control unit 5 compares the second difference Tdef2 with the third temperature difference threshold Tth3 and the fourth temperature difference threshold Tth4 (step S61). In the case of (third temperature difference threshold Tth3)≤(second difference Tdef2)< (fourth temperature difference threshold Tth4) (step S61: Tth3 or more and less than Tth4), the control unit 5 transmits, to the agitation unit 13, an operation command for instructing the agitation unit 13 to start a "weak"-setting mode agitating operation (step S62). In the case of (second difference Tdef2)≥(fourth temperature difference threshold Tth4) (step S61: Tth4 or more), the control unit 5 transmits an operation command for instructing the agitation unit 13 to start a "strong"-setting mode agitating operation, to the agitation unit 13 (step S63). In this way, in a case where the second difference Tdef2 between the floor surface temperature Tfr and the indoor ceiling temperature Tcel is equal to or larger than the third temperature difference threshold Tth3, the control unit 5 causes the agitation unit 13 to perform an agitating operation. After step S62 or step S63, in the air conditioning system 100, the ventilation unit 12 and the agitation unit 13 operate simultaneously.

The control unit 5 transmits a user presence/absence detection instruction to the human detection sensor unit 11 (step S64). Upon receiving the user presence/absence detection instruction, the human detection sensor unit 11 detects the presence of the user in the room at the time of the reception, and transmits the user presence/absence information to the control unit 5. The control unit 5 receives the user presence/absence information as a response to the user presence/absence detection instruction (step S65). The control unit 5 determines whether or not the user is present in the room (step S66). In the case of presence of the user in the room (step S66: Yes), the control unit 5 needs to start the air conditioning operation of the air conditioner 1, and therefore transmits a stop command for instructing the agitation unit 13 to stop its agitating operation, to the agitation unit 13 (step S67) and transmits a stop command for instructing the ventilation unit 12 to stop the ventilation operation, to the ventilation unit 12 (step S68). Then, the control unit 5 proceeds to an operation for step S42. The agitation unit 13 stops the agitating operation. The ventilation unit 12 stops the ventilation operation. The operation on or after step S42 is as described above. In the case of absence of the user in the room (step S66: No), the control unit 5 returns to an operation for step S57.

In the case of (second difference Tdef2)<(third temperature difference threshold Tth3) (step S61: less than Tth3), the control unit 5 transmits a stop command for instructing the ventilation unit 12 to stop its ventilation operation, to the ventilation unit 12 (step S69). The ventilation unit 12 stops the ventilation operation. The control unit 5 determines whether or not the agitation unit 13 is in the process of operation (step S70). When the agitation unit 13 is in operation (step S70: Yes), the control unit 5 transmits a stop command for instructing the agitation unit 13 to stop its agitating operation, to the agitation unit 13 (step S71). The agitation unit 13 stops the agitating operation. When the agitation unit 13 is in a stopped state (step S70: No), the control unit 5 skips an operation for step S71 and proceeds to an operation for step S42. The operation on or after step S42 is as described above.

In this way, the control unit 5 controls the operations of the ventilation unit 12 and the agitation unit 13 before the user enters the room. In steps S33 to S35 and in steps S61 to S63, the control unit 5 controls the operation of the agitation unit 13 based on comparison of the second difference Tdef2 between the floor surface temperature Tfr and the indoor ceiling temperature Tcel with the third temperature difference threshold Tth3 and the fourth temperature difference threshold Tth4. However, the present invention is not limited to this manner. When the user set temperature difference thresholds more finely in advance, the control unit 5 can control the operation of the agitation unit 13 more finely. That is, it is possible to prepare more control modes for the agitation unit 13, in addition to the three modes: stop, weak operation, and strong operation.

In an operation for step S15, the control unit 5 calculates an average value of the floor surface temperature information and the indoor ceiling temperature information, and sets the calculated average value as the indoor temperature. However, the present invention is not limited to this manner. The control unit 5 may use the indoor ceiling temperature information, that is, the indoor ceiling temperature, as the indoor temperature. In the operations for steps S43 to S45, the control unit 5 acquires the indoor ceiling temperature information for comparison with the target temperature. However, the present invention is not limited to this manner. The control unit 5 may further acquire floor surface temperature information from the floor surface temperature sensor unit 6, calculate the indoor temperature as the average value of the floor surface temperature information and the indoor ceiling temperature information, and compare the calculated indoor temperature with the target temperature.

Next, the hardware configuration of the control unit 5 of the air conditioner 1 will be described. The control unit 5 is implemented by processing circuitry. The processing circuitry may be a memory and a processor that executes a program stored in the memory, or may be dedicated hardware.

Figure 7:
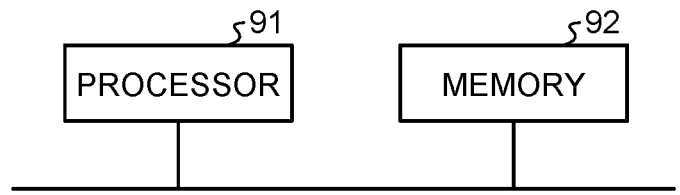
FIG. 7 is a diagram illustrating an exemplary case where the processing circuitry owned by an air conditioner is configured with a processor and a memory.

FIG. 7 is a diagram illustrating an exemplary case where the processing circuitry of the air conditioner 1 according to the present embodiment is configured with a processor and a memory. In a case where the processing circuitry is configured with the processor 91 and the memory 92, each function of the processing circuitry of the air conditioner 1 is implemented by software, firmware, or any combination of software and firmware. Software or firmware is described as programs and stored in the memory 92. In the processing circuitry, the processor 91 reads out and executes the programs stored in the memory 92, thereby implementing the functions. That is, the processing circuitry includes the memory 92 for storing the programs by which the processing in the control unit 5 is executed resultantly. It can also be said that these programs cause a computer to execute the procedures and methods for the control unit 5.

The processor 91 may be a central processing unit (CPU), a processing device, an arithmetic device, a microprocessor, a microcomputer, a digital signal processor (DSP), or some device like that. Examples of the memory 92 include a non-volatile or volatile semiconductor memory, a magnetic disk, a flexible disk, an optical disc, a compact disc, a mini disc, a digital versatile disc (DVD), and the like. Examples of non-volatile or volatile semiconductor memories include a random access memory (RAN), a read only memory (ROM), a flash memory, an erasable programmable ROM (EPROM), an electrically EPROM (EEPROM (registered trademark)), and the like.

In a case where the processing circuitry is configured with dedicated hardware, the processing circuitry corresponds, for example, to a single circuit, a composite circuit, a programmed processor, a parallel programmed processor, an application specific integrated circuit (ASIC), a field programmable gate array (FPGA), or any combination thereof.

The functions of the control unit 5 may be implemented by a processing circuit or processing circuits separately for each of the functions or collectively for all the functions. Note that some of the functions of the control unit 5 may be implemented by dedicated hardware, and the other thereof may be implemented by software or firmware. In this manner, the processing circuitry can implement the above-described functions using dedicated hardware, software, firmware, or any combination thereof.

As described above, according to the present embodiment, in the air conditioning system 100, the control unit 5 of the air conditioner 1 determines whether to cause the ventilation device 2 to perform a ventilation operation, whether to cause the air agitation device 3 to perform an agitating operation, and whether to cause the ventilation device 2 and the air agitation device 3 to simultaneously operate on the basis of the difference between the indoor temperature and the outdoor temperature, the magnitude relationship between the indoor temperature and the outdoor temperature, the operation mode of the air conditioner 1 specified by the user using the air conditioning operation instruction, the suspension period and duration of the ventilation operation of the ventilation device 2, etc., so as to cause the ventilation device 2 and the air agitation device 3 to perform the ventilation operation and the agitating operation for an appropriate period of time, respectively. Accordingly, the air conditioning system 100 for controlling air conditioning before the user enters the room can perform the ventilation operation of the ventilation device 2 and the agitating operation of the air agitation device 3 before operating the air conditioner 1.

Even in a room equipped with a ventilation device that does not support a 24-hour ventilation system, the air conditioning system 100 can let fresh air into the room, equalize the distribution of indoor temperature through the agitating operation of the air agitation device 3, and provide a comfortably air-conditioned space before the user enters the room, without regard to a heating operation or a cooling operation, while reducing the load in operating the air conditioner 1.

After the user in a place away from home operates the air conditioning system 100 via the terminal device 17, the user may not enter the room even though a comfortable environment has been accordingly constructed. In this case, the air conditioning system 100 can transmit a reminder e-mail thereby making it possible to prevent the air conditioner 1 from wasting its operating power.

The configurations described in the above-mentioned embodiment illustrate examples of the contents of the present invention, and each of them can be combined with other publicly known techniques and partially omitted and/or modified without departing from the scope of the present invention.

The invention claimed is:

1. An air conditioning system for controlling air conditioning in a room in accordance with an air conditioning operation instruction received from a user, the air conditioning system comprising:
a ventilation device having a ventilation fan configured to ventilate an entirety of the room; a suspension period timer to measure a suspension period from a time that the ventilation fan stops ventilation operation; and an operation duration timer to measure a duration from a time that the ventilation fan starts ventilation operation;
an air agitation device having an indoor installation circulator fan configured to agitate air in the room;

an air conditioner to control the air conditioning of the room and control operations of the ventilation device and the air agitation device; and a detection device including a detection sensor configured to detect presence of the user in the room, wherein the air conditioner includes a control unit having at least one of processing circuit and/or a processor and memory configured to control operations of the ventilation device and the air agitation device before the user enters the room on the basis of an indoor temperature that is a temperature inside the room, an outdoor temperature that is a temperature outside the room, an operation mode of air conditioning control performed by the air conditioner included in the air conditioning operation instruction, an operating status of the ventilation device, and a detection result provided by the detection device, and calculate an average value of an indoor ceiling temperature and a floor surface temperature to be set as the indoor temperature, acquire the suspension period and the duration as an operating status of the ventilation device, and control operations of the air conditioner, the ventilation fan, and the indoor installation circulator fan based on the indoor temperature, the outdoor temperature, the air conditioning operation instruction, the operating status of the ventilation device, and the detection result.

2. The air conditioning system according to claim 1, wherein the air agitation device includes:
a floor surface temperature sensor to measure the floor temperature in the room, and the air conditioner includes:
an air conditioning unit to perform air conditioning operation;
an indoor temperature sensor to measure the indoor ceiling temperature that is an air temperature near a ceiling of the room; and
an outdoor temperature sensor to measure the outdoor temperature the control unit being further configured to control operations of the air conditioning unit based on the indoor temperature, the outdoor temperature, the air conditioning operation instruction, the operating status of the ventilation device, and the detection result.

3. The air conditioning system according to claim 1, wherein the control unit is configured to in a case where the suspension period is equal to or longer than an upper limit suspension period and the detection result indicates that the user is not present in the room, cause the ventilation fan to perform a ventilation operation, and in a case where a first difference between the indoor temperature and the outdoor temperature is equal to or larger than a first temperature difference threshold and the operation mode is a heating operation mode, cause the ventilation fan to perform a ventilation operation based on a comparison result between the first difference and a second temperature difference threshold, and thereafter cause the ventilation fan to stop the ventilation operation.

4. The air conditioning system according to claim 1, wherein the control unit is configured to in a case where the suspension period is equal to or longer than an upper limit suspension period and the detection result indicates that the user is not present in the room, cause the ventilation fan to perform the ventilation operation, and in a case where a first difference between the indoor temperature and the outdoor temperature is equal to or larger than a first temperature difference threshold, the operation mode is a cooling operation mode, and the indoor temperature is equal to or less than the outdoor temperature, cause the ventilation fan to perform a ventilation operation based on a comparison result between the first difference and a second temperature difference threshold, and thereafter cause the ventilation fan to stop the ventilation operation.

5. The air conditioning system according to claim 3, wherein the control unit is configured to cause the ventilation fan to stop the ventilation operation in response to receiving, during the ventilation operation of the ventilation fan, a detection result indicating that the user is present in the room.

6. The air conditioning system according to claim 3, wherein the control unit is configured to in a case where a second difference between the floor surface temperature and the indoor ceiling temperature is equal to or larger than a third temperature difference threshold, cause the indoor installation circulator fan to perform an agitating operation.

7. The air conditioning system according to claim 6, wherein the control unit is configured to cause the indoor installation circulator fan to stop the agitating operation in response to receiving, during the agitating operation of the indoor installation circulator fan, a detection result indicating that the user is present in the room.

8. The air conditioning system according to claim 1, wherein the control unit is configured to in a case where the suspension period is equal to or longer than an upper limit suspension period and the detection result indicates that the user is not present in the room, cause the ventilation fan to perform the ventilation operation, and during a ventilation operation of the ventilation fan, in a case where a first difference between the indoor temperature and the outdoor temperature is less than a first temperature difference threshold and a second difference between the floor surface temperature and the indoor ceiling temperature is equal to or larger than a third temperature difference threshold, cause the indoor installation circulator fan to perform an agitating operation.

9. The air conditioning system according to claim 1, wherein the control unit is configured to in a case where the suspension period is equal to or longer than an upper limit suspension period and the detection result indicates that the user is not present in the room, cause the ventilation fan to perform a ventilation operation, and during the ventilation operation of the ventilation fan, in a case where a first difference between the indoor temperature and the outdoor temperature is equal to or larger than a first temperature difference threshold, the operation mode is a cooling operation mode, the indoor temperature is higher than the outdoor temperature, and a second difference between the floor surface temperature and the indoor ceiling temperature is equal to or larger than a third temperature difference threshold, cause the indoor installation circulator fan to perform an agitating operation.

10. The air conditioning system according to claim 8, wherein
the control unit is configured to cause the ventilation fan to stop the ventilation operation and cause the indoor installation circulator fan to stop the agitating operation in response to receiving, during the ventilation operation of the ventilation fan and the agitating operation of the indoor installation circulator fan, a detection result indicating that the user is present in the room.

11. The air conditioning system according to claim 1, wherein
the detection sensor includes a human detection sensor to detect the presence of the user in the room.

12. The air conditioning system according to claim 2, wherein the control unit is configured to
in response to determining that a current time has reached an operation start time included in the air conditioning operation instruction, start to control the air conditioning unit, the ventilation fan, and the indoor installation circulator fan.

13. The air conditioning system according to claim 2, wherein the control unit is configured to
in a case where the air conditioning operation instruction does not include an operation start time, start to control the air conditioning unit, the ventilation fan, and the indoor installation circulator fan after receiving the air conditioning operation instruction.

14. The air conditioning system according to claim 12, wherein
the control unit is configured to control an air conditioning operation of the air conditioning unit in a state in which the ventilation fan is not performing the ventilation operation and the indoor installation circulator fan is not performing the agitating operation.

15. The air conditioning system according to claim 12, wherein the control unit is configured to
in response to determining that the indoor ceiling temperature has reached a target temperature included in the air conditioning operation instruction, transmit, to a terminal device that is a transmission source of the air conditioning operation instruction, a first notification indicating that the indoor temperature has reached the target temperature.

16. The air conditioning system according to claim 15, wherein
the air conditioner includes a post-environment-construction timer to measure an elapsed time from a time that the indoor ceiling temperature reaches the target temperature included in the air conditioning operation instruction, and
the control unit is configured to, in response to determining that the elapsed time has reached or exceeded a waiting time, transmit a second notification that reminds the user to return home to the terminal device, or cause the air conditioning unit to stop the air conditioning operation.

17. The air conditioning system according to claim 1, wherein
the air conditioner receives the air conditioning operation instruction from at least one of a terminal device usable in the room and outside the room and a remote controller usable in the room.

18. The air conditioning system according to claim 4, wherein
the control unit is configured to cause the ventilation fan to stop the ventilation operation in response to receiving, during the ventilation operation of the ventilation fan, a detection result indicating that the user is present in the room.

19. The air conditioning system according to claim 4, wherein the control unit is configured to
in a case where a second difference between the floor surface temperature and the indoor ceiling temperature is equal to or larger than a third temperature difference threshold, cause the indoor installation circulator fan to perform an agitating operation.

20. The air conditioning system according to claim 19, wherein
the control unit is configured to cause the indoor installation circulator fan to stop the agitating operation in response to receiving, during the agitating operation of the indoor installation circulator fan, a detection result indicating that the user is present in the room.

21. The air conditioning system according to claim 9, wherein
the control unit is configured to cause the ventilation fan to stop the ventilation operation and cause the indoor installation circulator fan to stop the agitating operation in response to receiving, during the ventilation operation of the ventilation fan and the agitating operation of the indoor installation circulator fan, a detection result indicating that the user is present in the room.

22. The air conditioning system according to claim 13, wherein
the control unit is configured to control an air conditioning operation of the air conditioning unit in a state in which the ventilation fan is not performing the ventilation operation and the indoor installation circulator fan is not performing the agitating operation.

23. The air conditioning system according to claim 13, wherein the control unit is configured to
in response to determining that the indoor ceiling temperature has reached a target temperature included in the air conditioning operation instruction, transmit, to a terminal device that is a transmission source of the air conditioning operation instruction, a first notification indicating that the indoor temperature has reached the target temperature.

24. The air conditioning system according to claim 23, wherein
the air conditioner includes a post-environment-construction timer to measure an elapsed time from a time that the indoor ceiling temperature reaches the target temperature included in the air conditioning operation instruction, and
the control unit is configured to, in response to determining that the elapsed time has reached or exceeded a waiting time, transmit a second notification that reminds the user to return home to the terminal device, or cause the air conditioning unit to stop the air conditioning operation.

* * * * *